United States Patent [19]

Hayman-Chaffey

[11] Patent Number: 5,480,698
[45] Date of Patent: Jan. 2, 1996

[54] ACRYLIC OR POLYCARBONATE SHEET-LACQUER LAMINATES AND ARTICLES OF FURNITURE MADE THEREFROM

[76] Inventor: Charles Hayman-Chaffey, 138 E. 26th St., New York, N.Y. 10010

[21] Appl. No.: 305,190

[22] Filed: Sep. 13, 1994

[51] Int. Cl.[6] .............................. B32B 3/00; B32B 27/08; B32B 27/00; B05B 5/00
[52] U.S. Cl. .......................... 428/86; 428/201; 428/203; 428/207; 428/409; 428/412; 428/423.3; 428/520; 427/203; 427/258; 427/261; 264/129; 264/131
[58] Field of Search ............................ 428/412, 86, 201, 428/207, 203, 409, 423.3, 520; 427/203, 258, 261; 264/129, 131

[56] References Cited

U.S. PATENT DOCUMENTS

| | | |
|---|---|---|
| 1,802,169 | 1/1930 | Colbert et al. . |
| 1,988,239 | 10/1931 | Cruikshank . |
| 3,109,746 | 7/1957 | Seedorf . |
| 3,421,932 | 1/1969 | McGregor Jr. et al. . |
| 3,547,766 | 12/1970 | Chu et al. ................... 161/90 |
| 3,900,326 | 8/1975 | Herzhoff et al. ............. 96/114.8 |
| 3,973,062 | 8/1976 | Fahrni ........................ 427/420 |
| 4,177,099 | 12/1979 | Radzwill ...................... 156/99 |
| 4,179,760 | 12/1979 | Nakagawa ..................... 4/166 |
| 4,293,603 | 10/1981 | Hayman-Chaffey et al. ........ 428/86 |
| 4,329,386 | 5/1982 | Samowich ................... 428/196 |
| 4,721,642 | 1/1988 | Yoshimi et al. .............. 428/90 |
| 4,894,278 | 1/1990 | Servais et al. .............. 428/201 |
| 4,948,654 | 8/1990 | Brooks et al. ............... 428/201 |
| 5,034,275 | 7/1991 | Pearson et al. .............. 428/336 |
| 5,128,194 | 7/1992 | Sorko-Ram ................... 428/172 |
| 5,143,759 | 9/1992 | Saito et al. ................. 427/420 |
| 5,215,811 | 6/1993 | Reafler et al. .............. 428/212 |

OTHER PUBLICATIONS

Sherwin Williams Color Prime Ultra–Fill II P6–A47; Sales Information Sunfire Acrylic Urethane Basecoat/Clearcoat System; Product At–A–Glance.

High Soids, Air Dry, UCC–835; Product Information V6–V767; VOC Reduction Chart.

Primary Examiner—P. C. Sluby
Attorney, Agent, or Firm—Ronald P. Kananen

[57] ABSTRACT

A method of making a laminate and articles of furniture made from the laminate are disclosed wherein a transparent acrylic or polycarbonate sheet is coated with a clear urethane coating composition to at least a portion of one surface of the acrylic or polycarbonate composition sheet. The coated sheet is then treated with a water-based or latex color coating composition over the urethane coating. A urethane primer-surfacer coating composition is then applied over that portion of the sheet to which the color coating has been applied. The surface of the sheet is then adhesively bonded to a backing member, in which the uncoated surface of the acrylic sheet layer forms the outer layer of the laminated article. Preferably, the urethane coating composition is a low VOC urethane coating composition containing less than 4.0 pounds of volatile organic compounds per gallon of urethane coating composition.

23 Claims, 3 Drawing Sheets

ACRYLIC OR POLYCARBONATE SHEET-LACQUER LAMINATES AND ARTICLES OF FURNITURE MADE THEREFROM

BACKGROUND OF THE INVENTION

This invention relates to a method of making a decorative laminate which poses less of a threat to the environment. More particularly, this invention relates to an article made from a laminate made according to the environmentally-benign method of the invention. Still more particularly, this invention relates to a method of making an article of furniture from the decorative laminate which does not result in a significant release of volatile organic compounds into the environment.

Particularly in recent times, the art of designing and manufacturing contemporary furniture has recognized furniture as an art form. Thus, a large selection of furniture and accessory pieces made of acrylic, wood, and metal have evolved from new concepts in furniture design which consider the sculptural as well as the functional role of furniture. By way of example, some designers have effectively utilized acrylic materials, either alone or in conjunction with wood and metal, to form unique and often abstract articles of furniture and accessories.

Acrylic materials, both in a clear form and in solid color form, have been available for quite some time. For example, a "PLEXIGLAS" brand acrylic is a cast thermoplastic acrylic resin sheet produced in a number of formulations to provide specific physical properties required for various types of applications. "PLEXIGLAS" is a registered trademark for such acrylic sheets of the Rohm and Haas Company, Philadelphia, Pa. In addition, "LUCITE" acrylic sheets have been available from E. I. Dupont de Nemours & Co and are now currently available from ICI as "LUCITE BY ICI." Both brands of acrylic sheets have found their way into such decorative furniture designs.

However, the completely effective use of acrylic sheets to form durable and decorative surfacing of furniture has been a problem in the art. It is, of course, desirable that articles made from such acrylic sheets have a durable and decorative surfacing and be scratch-resistant. In the past, however, acrylic sheets have generally exhibited poor abrasion-resistance and have been difficult to color or to pattern. However, both DuPont and Swedlow, Inc. produce acrylic sheets having abrasion-resistant or super-abrasion-resistant qualities. DuPont produces an abrasion-resistant sheet having improved abrasion-resistant qualities for use in applications where optical quality, cleanability, and long term retention of properties is important. Thus, "LUCITE SAR" has been developed by DuPont which has a surface comprising a cross-linked polysilicate resin to provide the acrylic sheet with a combination of properties including abrasion resistance, solvent resistance, and weatherability. In addition, DuPont "LUCITE SAR" brand acrylic sheet can be cleaned using conventional glass cleaners and is resistant to many chemicals which attack other commonly used transparent plastic sheets, including acids, bases, hydrocarbons, esters and alcohols. The Swedlow abrasion resistant sheet is sold under the "ACRIVUE" trademark and is available from Swedlow, Inc., Garden Grove, Calif. Additionally, Nevamar manufactures a hard coated acrylic sheet. But such materials continue to be difficult to color and pattern.

The use of colorful and durable sheets of other, non-acrylic materials as a surface for various articles of furniture also exists in the prior art. For example, the use of the well-known "FORMICA" brand laminate on counter tops is well known. In addition, other similar materials generally of a solid color, or of a marbled decorative pattern because of the nature of the process to form the laminate, have been used as a decorative outer layer for furniture or accessories.

It has, however, been difficult to produce a colorful, durable, and decorative surfacing for furniture made from acrylic or polycarbonate sheets. This problem is largely founded on obstacles to patterning the coloring in a contemporaneous fashion and in a manner which is bright, lustrous, and resistant to fading, while at the same time exhibiting colors which are extraordinarily brilliant and exhibit an apparent depth which is attractive to the eye.

The painting of acrylic sheets with an acrylic lacquer is known in the prior art. Where acrylic paints have been applied to the outer surface of the acrylic sheet, such paints have been handpainted and highly rubbed to provide a brilliant, lustrous finish. Such processing, however, is time consuming and expensive. In addition, such articles have suffered from the problem of chipping, peeling and fading.

The backpainting of acrylic sheets with an acrylic lacquer is also known in the prior art. For example, U.S. Pat. No. 4,107,235 to DeWitt discloses an acrylic coating composition for use in back-painting impact-resistant acrylic sheets for use as signs.

However, none of these approaches of the prior art has been entirely satisfactory in two significant respects. The first relates to the depth, color and brilliance heretofore exhibited by painted acrylic lacquer sheets. The second relates to the ability to form patterns on the acrylic sheet of contemporary design on a selective, non-repetitive basis for use in manufacturing contemporary furniture.

A partial solution to these problems was offered in U.S. Pat. No. 4,293,603 to Hayman-Chaffey et al. which disclosed a method of making a laminate in which a transparent acrylic sheet was coated with an acrylic paint coating composition on one side in a predetermined color and decorative pattern. The coated sheet was then coated with an acrylic primer coating composition over the acrylic paint coating. The sheet was then subsequently adhesively secured to a backing member, such as barrel board for fabrication into furniture.

Unfortunately, such laminates required the use of acrylic paint coatings and acrylic primer coatings, both of which contain substantial amounts of volatile organic compounds (VOC).

VOC is an abbreviation for Volatile Organic Compounds. With regard to paints and coatings, VOC refers to how much solvent a paint or coating contains. VOC includes most solvents except for an exempt few, such as chlorinated solvents (for example, 1,1,1-trichloroethane) and water.

VOC has become an issue within the last ten years since the Environmental Protection Agency (EPA) has begun to try to improve air quality by lowering air pollution. Solvents (VOC) have been proven to be a contributor to air pollution. Certain solvents can be broken down by sunlight when in the atmosphere. The resulting compounds can cause irritation of the eyes, nose, and throat and, generally, are a health hazard.

VOC laws are designed to reduce the VOC (solvent) emissions of large users of solvents. These restrictions reduce the amount of VOC (solvent) that a coating can contain. VOC is measured in either pounds/gallon or grams/liter. VOC laws also usually limit the sprayable VOC. For example, if a coating is rated at 3.5 pounds/gallon (sprayable), it means that one sprayable gallon of a coating contains 3.5 pounds of solvent. This excludes water and exempted solvents.

Various regions of the United States either have adopted VOC limits or are considering instituting such limits in the near future. Accordingly, there remains a need for a method of making a decorative laminated acrylic or polycarbonate article which does not result in a significant discharge of VOC during manufacture of the laminate.

Thus, it is an overall object of this invention to provide a method of making a decorative laminated article suitable for use in making furniture which does not pose a substantial threat to the environment.

It is an additional object of this invention to provide an article of furniture made from a decorative laminated article manufactured according to the environmentally-benign method of the present invention.

It is another object of this invention to provide a surface material for furniture which is bright, lustrous, and resistant to fading and scratching, while at the same time being relatively inexpensive to manufacture and which was manufactured by a process which did not result in a significant discharge of VOC during manufacture of the surface material.

It is a further object of this invention to provide a surfacing material particularly suitable for furniture which permits the use of color of extraordinary brilliance and depth, while at the same providing the colors with protection from chipping, peeling, and fading, and the manufacture of which does not pose a significant threat to the environment.

It is a further object of this invention to provide a durable and decorative surfacing material for furniture which may be bonded to a backing sheet with commonly used adhesive without damage to the surface material and which does not result in a significant release of volatile organic compounds into the environment.

It is a further object of this invention to provide a colorful and durable surfacing material for furniture with a large degree of freedom for the designer in the techniques used to apply the colors and patterns to the surfacing material and made according to the environmentally-benign method of the present invention.

It is still a further overall object of this invention to manufacture a laminate suitable for use in the manufacture of furniture by applying a clear urethane coating to a surface of an acrylic or polycarbonate composition sheet and applying a water-based or latex color coating to at least a portion of the surface of the sheet to which the clear urethane coating is applied, subsequently applying a primer-surfacer to the color coating, and thereafter laminating the coated surface of the sheet to a backing member to form such a laminate.

These and other objects of the invention will become apparent from a review of the detailed description of the invention which follows.

BRIEF SUMMARY OF THE INVENTION

Directed to achieving the aforementioned objects and to overcoming the problems of the prior art, this invention relates to a method of making a decorative laminated article. The method includes the steps of providing as a starting material an acrylic or polycarbonate composition sheet which includes a pair of opposed spaced surfaces. Preferably, one of the surfaces is an abrasion-resistant or super-abrasion-resistant surface of the type which is commercially available. The surface of the acrylic or polycarbonate sheet opposite to the abrasion-resistant surface is coated with a clear urethane coating composition. While this urethane coating is still tacky, a water-based or latex color coating is applied to the urethane coating in a selected color and in a selected pattern. Thereafter, an acrylic urethane primer-surfacer coating is applied over at least that portion of the sheet to which the water-based or latex paint coating has been applied. The coated surface of the sheet to which the urethane coating composition, the color coating, and the primer-surfacer coating have been applied is then adhered by an adhesive to a backing member to form a laminate.

Where an acrylic or polycarbonate sheet is available having an abrasion-resistant coating on both surfaces, it has been found preferable in practicing the invention to remove the abrasion-resistant coating on one surface, such as by sandblasting or sanding, prior to the application of the acrylic paint coating and acrylic primer coating composition.

In practicing the invention, the water-based or latex coating may be repetitively applied in predetermined decorative patterns and colors on successive portions of the coated surface to form a particular colorful design of choice. In addition, both the paint coating and the primer-surfacer coating may be applied with a paint brush, a paint roller, or a paint spray or by the use of silk screen techniques, or air brush techniques which are well known to the art.

A preferred suitable backing material for the laminate is any one of a number of fiber compositions which substantially do not incorporate continuous fiber materials in their composition. Both barrel board materials and clip board materials have been found to be satisfactory.

In manufacturing the article, barrel board material is provided in the appropriate shape and form of the furniture article to be manufactured. The base of the surface is preferably laminated first for stress relief. Edging is then applied followed by the application of the top surfaces, preferably made from the abrasion-resistant sheet. The article is then trimmed, routed and finished.

When the abrasion-resistant sheet is provided with a protective surface such as paper, it has been found advantageous in practicing the invention to utilize templates to scribe and remove only that portion of the paper which represents the design which will ultimately appear on the surface of the sheet. Thereafter, the exposed acrylic or polycarbonate sheet is painted and an additional portion of the paper backing is scribed to successively construct a pattern of interest to the designer and user of the article. Certainly, combinations of colors can be used to produce a desired effect such as fadings, transitions, spectral effects, and the like. For example, the color patterns need not have sharp edge definition, but rather may change in intensity through a range of a single color, or among several colors.

BRIEF DESCRIPTION OF THE DRAWINGS

A more complete appreciation of the present invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
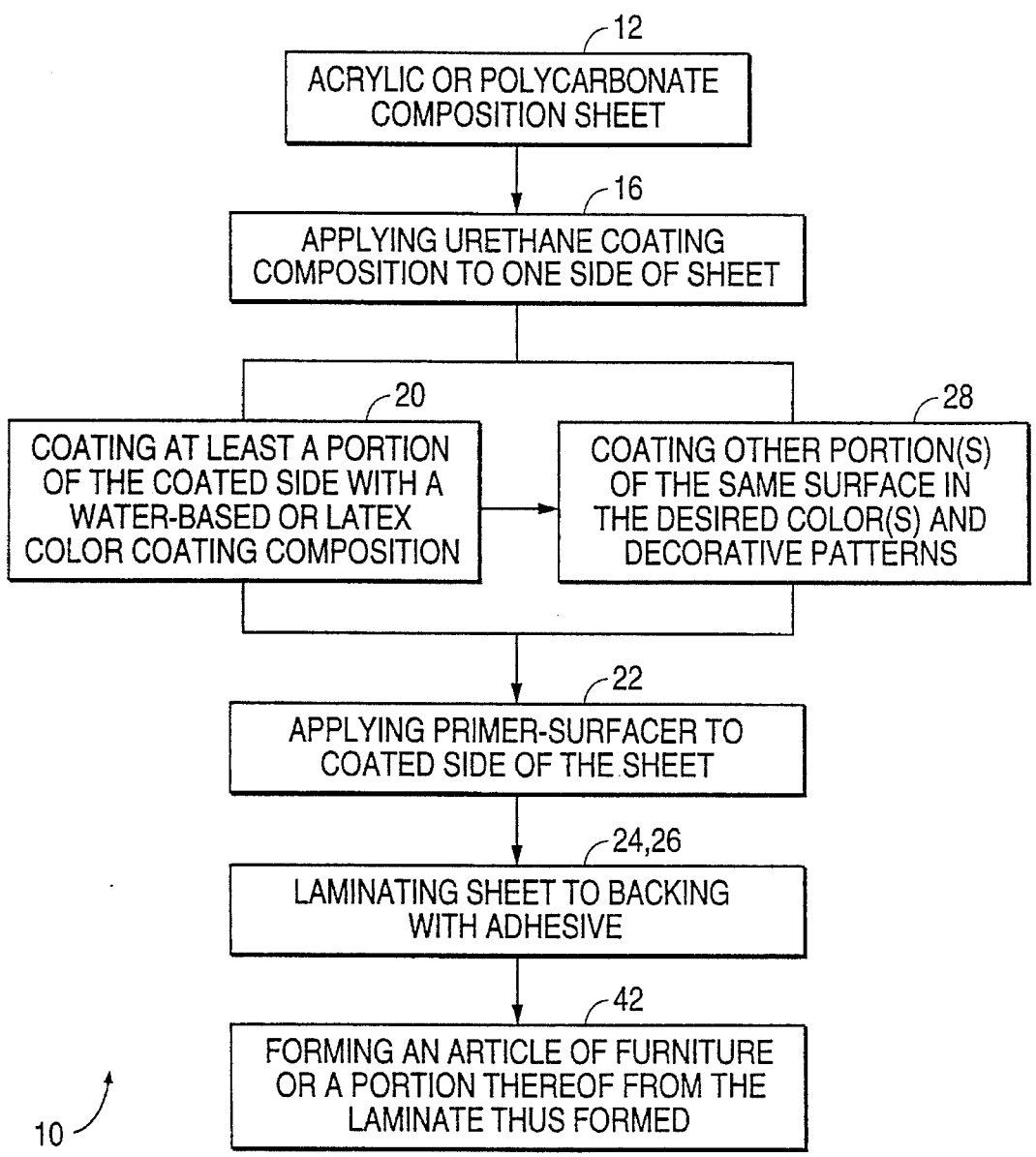
FIG. 1 is a block diagram of the basic steps in making both the decorative laminate and an article of furniture therefrom.

The method of making the decorative laminate and an article of furniture from the decorative laminate according to the invention is shown in block diagram in FIG. 1 and is designated generally by the reference numeral 10.

An acrylic or polycarbonate composition sheet 12 is provided as a starting material for the method according to the invention. The acrylic or polycarbonate sheet may be used in any thickness, but preferably the nominal 1/8" (3 mm) or 1/16" (1.6 mm) thickness sheets are employed. The acrylic or polycarbonate sheets can be cell cast, continuous cast or extruded. Choice of the type of sheet is based on the desired characteristics of the sheet.

The sheet 12 is commercially available and preferably includes an abrasion-resistant coating 14 on one surface thereof where the laminate or article will ultimately form a horizontal surface. One suitable acrylic composition sheet for the practice of the invention is available from Swedlow, Inc. under the brand name "ACRIVUE". The acrylic composition sheet available from Swedlow, Inc. has the advantage of having an abrasion resistant coating only on one side of the acrylic sheet and a temporary protective covering, such as paper, over both the abrasion-resistant coating surface and the surface opposite to the abrasion-resistant coating surface. In a preferred embodiment of the present invention, the hard coated acrylic sheet manufactured by Nevamar is employed.

Other suitable acrylic composition sheets are available from DuPont under the designations "LUCITE AR" and "LUCITE SAR", of which the latter is preferred. The former was introduced as an abrasion acrylic sheet in 1970 and has the advantage of being about 15 times more resistant to abrasion than conventional acrylic sheet material. More recently, DuPont has introduced "LUCITE SAR" brand super-abrasion-resistant acrylic sheets which are 75 times more abrasion-resistant than conventional acrylic composition sheets.

Any of the foregoing abrasion-resistant acrylic sheets are p-particularly suitable for use in making the laminate and furniture according to the invention and in particular for making horizontal surfaces thereof. The abrasion resistance as well as the resistance to chemicals, such as alcohol, make such material particularly suitable for table tops and the like. It is understood that the DuPont "LUCITE SAR" brand acrylic resin material is a clear acrylic sheet offering the advantages, among others, of such a sheet being provided with a thin coating of a cross-linked polysilicate resin to provide chemical resistance and abrasion resistance similar to glass. The particular composition and method of making the acrylic sheets, the abrasion-resistant acrylic sheets, or the super-abrasion-resistant acrylic sheets do not form a part of this invention.

The acrylic or polycarbonate sheet 12, which is preferably clear or transparent, is coated on one surface or at least a portion of one surface, as designated by the reference numeral 16, with a clear urethane coating composition.

The coating step may be performed in any of the conventional ways of applying coatings, such as by applying the urethane coating with a paint brush, a roller, or by a spray.

Application of the clear urethane coating composition is, preferably, by means of a curtain coater, thus maximizing transfer rates. Since approximately 30% of product is lost to the environment when one uses spray guns (atomization) as an application method, the use of a curtain coater is preferable for two reasons. By maximizing the transfer rate, one maximizes the product transfer efficiency, appreciably increasing the number of 4'×8' or 4'×10' sheets that can be coated with a single gallon (approximately 15 to 16 4'×8' sheets). Moreover, the curtain coating method emits less VOC's per sheet than would occur with spraying. This, however, does not preclude the use of a gun as a method of application.

The use of automotive low VOC acrylic urethane coating compositions has been found to be particularly advantageous and one source of such coating compositions is Sherwin Williams, although other low VOC acrylic urethane coating compositions may also be used.

A suitable definition of a low VOC coating composition is a coating composition containing less than 4.0 pounds of volatile organic compounds per gallon of composition.

Preferably, a Sherwin Williams SUNFIRE Low VOC acrylic urethane sold under the sales number V2-V1122 as SUNFIRE Low VOC Mixing Clear (Dry Air) or, more preferably, where one has access to forced infrared drying tunnels, V2-V1141 SUNFIRE Low VOC Mixing Clear (Force Dry).

A high solids, air-dry or forced-dry urethane clearcoat designated UCC-635/835 Low VOC from Sherwin Williams may also be employed.

Because the abrasion-resistant sheet from Swedlow is only coated on a single side, the opposite side from the abrasion-resistant coating is coated with the acrylic paint according to the invention. Where the abrasion-resistant sheet is coated on both sides with abrasion-resistant or super-abrasion-resistant coating, such as that provided by DuPont, it has been found desirable to remove the abrasion-resistant or super-abrasion-resistant surface from one side prior to painting. This surface layer, which is quite thin, can be removed by delicate sandblasting techniques known to the art, or by sandpapering, by way of example. Thus, in this respect, the Swedlow sheets are advantageous since they do not require the additional step of removing an abrasion resistant layer prior to painting. However, the abrasion-resistant sheet need not always be altered and the paint can be applied to the abrasion-resistant surface in the alternative, although this form of practicing the invention is not presently preferred.

After a surface of the acrylic or polycarbonate sheet has been coated with the clear urethane coating composition but while the urethane coating is still tacky and not entirely dried and hardened, then one or more color coating compositions 20 are applied in the desired color and decorative patterns.

The color coating can either be metallic or solid, depending on the color and tone required.

A water-based color coating composition may be used. Such water-based color coating compositions are commercially available, for example, such products are manufactured by Sherwin Willams. These coatings, while considerably more environmentally benign than organic-based coating compositions currently in use in the automotive industry and produced by a number of different manufacturers, still contain organic solvents (albeit greatly reduced quantities of solvents), thus their water-based designation.

In a preferred embodiment, a house wall latex paint composition may be used. Although conventionally such latex paints would normally be considered impossible to adhere to a sheet of clear acrylic, when the acrylic or polycarbonate sheet is initially treated with a clear urethane coating composition, the latex paint adheres to the sheet. Moreover, the resultant laminate is as resistant to normal fabrication and usage wear and to tear as with a laminate produced using the method disclosed in U.S. Pat. No. 4,293,603.

An exemplary composition by weight of such a latex wall paint manufactured by Pratt & Lambert, for example, is the following:

| Pigment 39.9% | |
|---|---|
| Titanium Dioxide Type III | 12.7% |
| Calcium Carbonate | 7.7% |
| Silicates | 19.5% |
| Vehicle 60.1% | |
| Vinyl Acrylic Resin | 11.3% |
| Glycol | 2.6% |
| Water | 46.2% |
| | 100.0% | emissions whatsoever, thus obviating regulatory and environmental concerns. In addition, by adding aluminum or mica particulates to these pigments, colors that are normally opaque or solid in nature can be easily transformed into metallics.

The coating step may be performed in any of the conventional ways of applying paints, such as by applying the paint coating with a paint brush, a roller, or by a spray. In addition, the paint coating may be applied by the use of silk screen techniques or by air brush techniques, or any other suitable techniques for applying a lacquer coating.

When only a single color is desired, the entire surface is painted with the water-based or latex paint composition as described. However, where only a portion of the surface is to be colored or the surface is to be multi-colored, successive coating steps are performed as will be described, in order to provide the desired endproduct in terms of color and design. The repetitive steps of coating other portions in the desired colors and decorative patterns are designated generally by the reference numeral 28.

Figure 2:
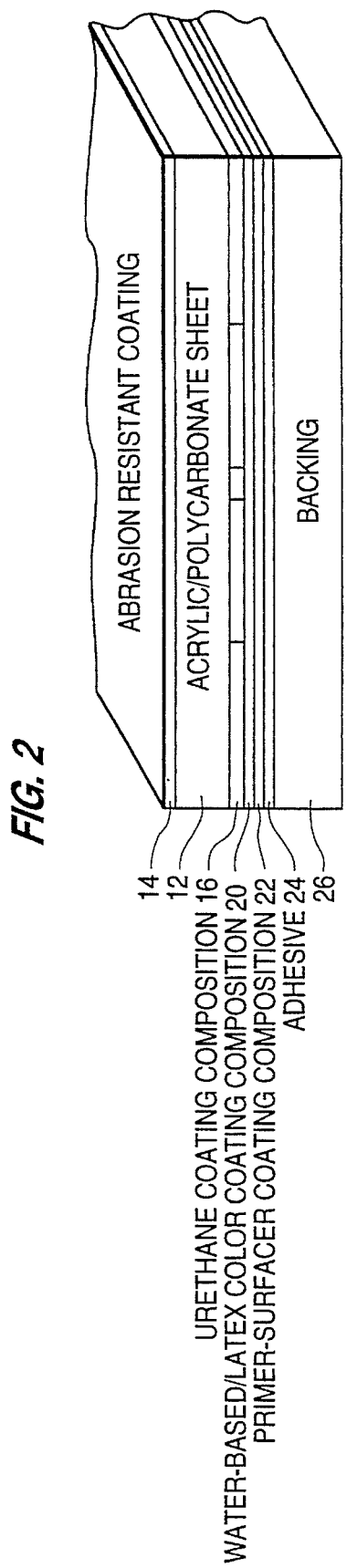
FIG. 2 is a side cross-sectional view of the laminate showing the various layers in an emphasized form.
Figure 3:
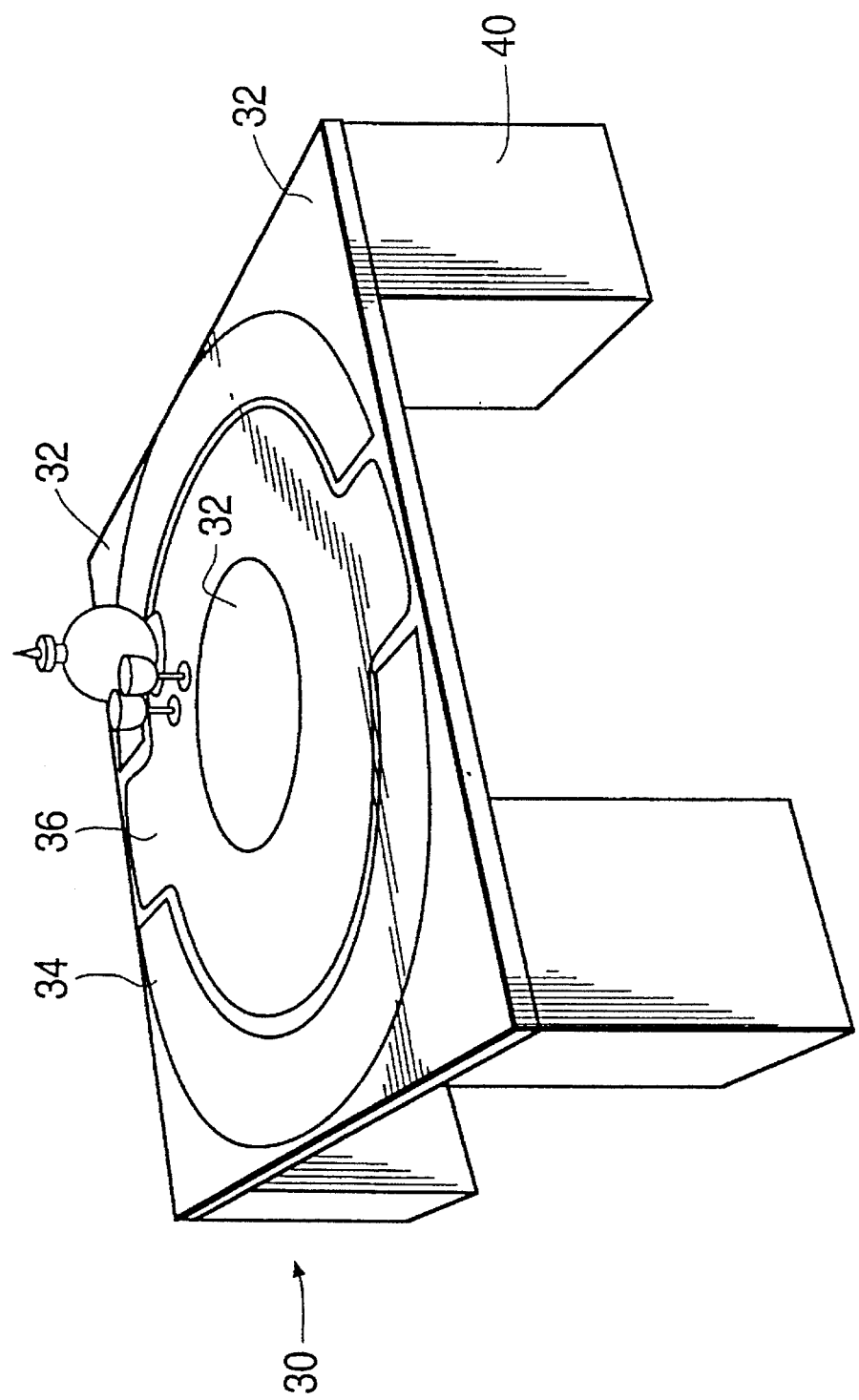
FIG. 3 is a representative example of an article of furniture, namely a cocktail table, having a decorative top surface made from the decorative laminate according to the invention using an abrasion-resistant acrylic and other surfaces thereof made from laminates according to the invention.

In FIG. 3, a cocktail table designated generally by the reference numeral 30 has been made utilizing the laminates prepared according to the present invention. On the surface 32 of the table, a decorative pattern is shown wherein the surface 32 is the color of charcoal, whereas the portion of the pattern designated by the reference numeral 34 is the color of oxblood and the portion designated by the reference numeral 36 is silver. When applying the colors, a template or mask is provided to block out the portions designated by the reference numerals 34 and 36 and the remainder of the sheet designated by the reference numeral 32 is coated with the desired charcoal-colored acrylic paint. Thereafter, the template or mask portion 34 is removed and the surface of the acrylic painted with oxblood-colored acrylic paint to produce the oxblood-colored portion and pattern 34 demonstrated in FIG. 3. Finally, the template or mask defining the pattern of the portion of the surface designated by the reference numeral 36 is removed from the rear surface of the laminate and the silver paint applied to the portion 36 to produce the overall effect. Thereafter, the laminate (after further processing described in connection with FIGS. 1 and 2) is used as the top of the cocktail table 30 and exhibits the pattern produced by the repetitive painting of the surface in the desired colors and decorative patterns sought by the designer. The article 30 shown in FIG. 3 is merely illustrative of a myriad of patterns and designs which can be produced on the sheet of acrylic according to the invention.

These color coatings must be applied over the not quite dry clear urethane coating composition which should be tacky to the touch, but not entirely dry and hardened. The application timer vary according to ambient conditions, humidity levels, and other parameters, and, depending on whether forced drying tunnels are used.

When the color coat is applied while the clear urethane coat is still drying, the colored pigment particulates lay out into that bed and are trapped within it as it continues to dry and harden, thus being trapped within it. When it is fully cured (anywhere from 16 hours to 3 ½ hours, depending upon on air dry or forced dry methods), the sheet is then coated with a primer-surfacer.

After a surface has been coated in the desired color and decorative patterns, an acrylic primer-surfacer 22 is applied over the entire surface. This is contrary to the established techniques of utilizing primers next to the surface to be painted and is a major distinction over painted acrylic sheets or laminates previously known to the prior art.

A preferred primer-surfacer is a Sherwin Williams Color-Prime Ultra-Fill Acrylic Urethane Tintable Primer-Surfacer P6-A47. The advantages of this primer-surfacer are considerable. The primer is a low VOC product at 4.41 lbs per gallon or 0.2205 lbs per 4'×8' sheet (@ 18 sheets covered per gallon by curtain coating method). Moreover, this primer-surfacer is tintable so that less material per square foot can be used to achieve the same hiding and protective values. It not only provides excellent adhesion to contact cements or other commonly used bonding glues and methods, but also acts as a superior corrosion protector for the color coat from solvents found in most commonly used adhesives.

The primer-surfacer coating step may be performed in any of the conventional ways of applying coatings, such as by applying the coating with a paint brush, a roller, or by a spray. However, application of the primer-surfacer coating composition is, preferably, by means of a curtain coater, thus maximizing transfer rates.

The backing 26 is preferably made from a material such as barrel board or chip board. Preferably, the backing does not have continuous fibers so that the irregularity of absorption is avoided. In this respect, plywood may be used, but is less satisfactory than either barrel board or chip board. A suitable source of barrel board is the 3M Company under the designation "MD-44". The coated acrylic or polycarbonate sheet is adhesively secured by an adhesive 24 to the backing board to provide the laminate desired, which may then be formed into an article of furniture according to the step designated generally by the reference numeral 42.

The techniques and processes for producing an article of furniture quite obviously vary with the particular article produced. Thus, the method of making the article shown in FIG. 3 need only be described in general terms. Assuming that a surface laminate having the desired pattern and shape to produce the table top has been provided for the article 30, it has been found advantageous to laminate the base of the barrel board surface for the table with an acrylic sheet which need not be decorated, such as with a FORMICA brand laminate for stress relief. Thereafter, the edging from a sprayed acrylic sheet according to the invention in a solid color is applied. Then, the top is applied having the abrasion resistant sheet surface on the outside. Thereafter, the article is trimmed, routed, and finished according to the known processes in the furniture making art. The legs 40 of the table 30 are made in a similar fashion. Neither the sides nor the bottom of the table top of the table 30 need to be made from an abrasion-resistant coating.

Moreover, since the surfaces of the legs, like the sides and bottom of the table top, are not expected to receive objects, those surfaces may be made from an acrylic sheet according to the invention which does not have an abrasion-resistant surface. Examples of materials suitable for use for such surfaces include "PLEXIGLAS" acrylic sheets available from Rohm and Haas Company and "LUCITE" acrylic sheets available from DuPont. The methods of securing the legs to the table are many and well known to the furniture making art.

While a cocktail table has been described, the invention may be used with other examples of contemporary furnishings, such as dining tables, consoles, wall units, cabinets and the like.

The transparent acrylic sheet which has been treated on one side with an abrasion-resistant coating of, for example, cross-linked polysilicate resin has proven particularly suitable for the practice of the invention. Such abrasion-resistant acrylic sheets combine the physical characteristics of cast acrylic sheets with an abrasion-resistant cleanable surface. The abrasion-resistant surface can be cleaned using conventional glass cleaner and exhibits excellent resistance to moisture and weathering. Such a durable outer layer makes the laminate of the present invention particularly suitable for commercial and outdoor applications as well as for furniture. Thus, although the decorative laminate has a particular advantage in manufacturing contemporary furniture, as has been emphasized in this description, it is clear that the laminate can be used in many other applications. For example, the laminate can be used as a decorative surface on walls and ceilings especially in commercial applications such as office buildings, apartment buildings, and restaurants.

In addition, the decorative laminate of the invention has numerous advantages over plain acrylic sheets which might be used in similar applications. Transparent acrylic sheets have the disadvantage that they must be held in place by screws or other unsightly hardware. If they were to be glued, the glue would be visible through the transparent sheet. If opaque acrylic sheets were to be used, they would be susceptible to scratching and wear and tear. Furthermore, the color available in such opaque sheets are limited and lack the brilliance of the acrylic lacquers of the present invention. Such paint acrylic sheets are also susceptible to attack from chemicals, such as alcohol. In addition, solid color acrylic sheets are often expensive and sometimes substantially more expensive than FORMICA brand acrylic sheets.

The invention may be embodied in other specific forms without departing form its spirit or essential characteristics. The present embodiments are, therefore, to be considered as illustrative but not restrictive, the scope of the invention being indicated by the claims rather than by the foregoing description and all changes which come within the meaning and range of the equivalents of the claims are therefore intended to be embraced therein.

What is claimed is:

1. A method of making a decorative laminated article comprising the steps of:
   (a) providing an acrylic or polycarbonate composition sheet which includes a pair of opposed surfaces;
   (b) applying a clear urethane coating composition to at least a portion of one surface of the acrylic or polycarbonate composition sheet;
   (c) applying a water-based or latex color coating composition over at least that portion of one surface of the sheet to which the urethane coating has been applied;
   (d) applying a urethane primer-surfacer coating composition over at least that portion of one surface of the sheet to which the color coating has been applied; and
   (e) adhesively bonding the surface of said sheet to which the urethane coating composition, the color coating and the primer-surfacer coating have been applied to a backing member, said backing member comprising a fiber composition,
   whereby the uncoated surface of the acrylic sheet layer forms the outer layer of the laminated article.

2. The method as set forth in claim 1, wherein said backing material is substantially a non-continuous fiber material.

3. The method as set forth in claim 1, wherein said urethane coating composition is a urethane coating composition containing less than 4.0 pounds of volatile organic compounds per gallon of urethane coating composition.

4. An article of furniture comprising a laminated article made according to the method of claim 1.

5. The method as set forth in claim 1, wherein said acrylic or polycarbonate composition sheet is transparent.

6. The method of making a decorative laminated article as set forth in claim 1, wherein said laminated article is an article of furniture.

7. The method of making a decorative laminated article as set forth in claim 1, wherein the step of applying the color coating is further defined in that the color coating is repeatedly applied in a predetermined decorative pattern on successive portions of the said one surface of the acrylic composition sheet.

8. The method of making a decorative laminated article as set forth in claim 7, wherein the steps of applying the color coating are performed by means of at least one step selected from the group consisting of: applying with a paint brush, roller, or spray; applying by the use of silk screen techniques; and applying by air brush techniques.

9. The method of making a decorative laminated article as set forth in claim 7, wherein said laminated article is an article of furniture.

10. The method of making a decorative laminated article as set forth in claim 7, wherein the surface of the acrylic or polycarbonate composition sheet opposite to which the clear urethane coating composition, water-based or latex color coating composition, and urethane primer-surface coating composition are applied has a abrasion-resistant surface coating or a super-abrasion-resistant surface coating, which surface coating forms the outer surface of the laminated article.

11. An article of furniture comprising a laminated article made according to the method of claim 10.

12. The method of making a decorative laminated article as set forth in claim 1, wherein the steps of applying the color coating are performed by means of at least one step selected from the group consisting of: applying with a paint brush, roller, or spray; applying by the use of silk screen techniques; and applying by air brush techniques.

13. The method of making a decorative laminated article as set forth in claim 12, wherein said laminated articled is an article of furniture.

14. The method of making a decorative laminated article as set forth in claim 12, wherein the surface of the acrylic or polycarbonate composition sheet opposite to which the acrylic paint coating and the acrylic primer coating are applied has an abrasion-resistant surface coating or a super-abrasion-resistant surface coating, which coating forms the outer surface of the laminated article.

15. An article of furniture comprising a laminated article made according to the method of claim 14.

16. The method of making a decorative laminated article as set forth in claim 1, wherein the surface of the acrylic composition sheet opposite to which the acrylic paint coating and acrylic primer coating are applied has an abrasion-resistant surface coating or a super-abrasion-resistant surface coating, which surface coating forms the outer surface of the laminated article.

17. An article of furniture comprising a laminated article made according to the method of claim 16.

18. The method of making a decorative laminated article as set forth in claim 16, wherein said laminated article is an article of furniture.

19. An article of furniture comprising:

an acrylic or polycarbonate composition sheet comprising a pair of opposed surfaces;

a layer of a urethane coating composition on at least a portion of one surface of the sheet;

a layer of a water-based or latex color coating over at least that portion of the sheet on the same side thereof to which the urethane coating composition has been applied;

a layer of a primer-surfacer over at least that portion of the sheet on the same side thereof to which the color coating composition has been applied; and a backing member adhesively secured to said acrylic or polycarbonate composition sheet on the same side thereof to which the urethane coating composition, the color coating, and the primer-surfacer composition has been applied, said backing member comprising a fiber composition.

20. The article as set forth in claim 19, wherein the acrylic composition sheet is transparent prior to application of the color coating composition.

21. The article as set forth in claim 19, wherein the color coating composition comprises various colors in a decorative pattern across the said one surface of said sheet.

22. The article as set forth in claim 19, wherein the other surface of said acrylic or polycarbonate sheet has an abrasion-resistant surface coating.

23. The article as set forth in claim 19, wherein the other surface of said acrylic or polycarbonate sheet has a super-abrasion-resistant surface coating.

\* \* \* \* \*